United States Patent
Rinne et al.

(10) Patent No.: US 9,736,133 B2
(45) Date of Patent: Aug. 15, 2017

(54) METHOD AND APPARATUS FOR PROVIDING ENHANCED AUTHENTICITY FOR MULTIMEDIA DATA ITEM

(71) Applicant: P2S Media Group Oy, Helsinki (FI)

(72) Inventors: Timmo Johannes Rinne, Helsinki (FI); Ville Aleksi Laurikari, Littoinen (FI); Jussi Pekka Markula, Lahti (FI); Petri Oskari Rahja, Espoo (FI)

(73) Assignee: P2S Media Group Oy, Helsinki (FI)

( * ) Notice: Subject to any disclaimer, the term of this patent is extended or adjusted under 35 U.S.C. 154(b) by 230 days.

(21) Appl. No.: 14/357,631

(22) PCT Filed: Nov. 12, 2012

(86) PCT No.: PCT/FI2012/051100
§ 371 (c)(1),
(2) Date: May 12, 2014

(87) PCT Pub. No.: WO2013/072555
PCT Pub. Date: May 23, 2013

(65) Prior Publication Data
US 2014/0250497 A1    Sep. 4, 2014

(30) Foreign Application Priority Data
Nov. 14, 2011    (FI) .................... 20116125

(51) Int. Cl.
*H04L 29/06*    (2006.01)
*H04W 12/10*    (2009.01)
(Continued)

(52) U.S. Cl.
CPC .............. *H04L 63/08* (2013.01); *H04L 63/12* (2013.01); *H04L 65/604* (2013.01);
(Continued)

(58) Field of Classification Search
CPC ....................................................... H04L 63/08
See application file for complete search history.

(56) References Cited

U.S. PATENT DOCUMENTS 5,987,136 A    11/1999  Schipper et al.
6,750,902 B1 *  6/2004  Steinberg ............... G03B 7/091
                                                            348/211.3
(Continued)

OTHER PUBLICATIONS

Rich Gossweiler, Easily create digital picture stories through cell phone cameras, Jan. 31, 2005.*
(Continued)

*Primary Examiner* — Kambiz Zand
*Assistant Examiner* — Thanh Le
(74) *Attorney, Agent, or Firm* — Ziegler IP Law Group, LLC (57) ABSTRACT

A method for providing enhanced authenticity for a multimedia data item, the multimedia data item including captured multimedia data with associated metadata, wherein the method includes receiving the multimedia data item over a transmission path. The method further includes defining path information for the received multimedia data item based on the used transmission path; and storing the path information to the multimedia data item for providing enhanced authenticity of the association between the metadata and the captured multimedia data.

16 Claims, 7 Drawing Sheets

(51) Int. Cl.
*H04N 1/32* (2006.01)
*H04W 4/18* (2009.01)
*H04W 88/04* (2009.01)
*H04L 29/08* (2006.01)

(52) U.S. Cl.
CPC ........ *H04N 1/32128* (2013.01); *H04W 4/185* (2013.01); *H04W 12/10* (2013.01); *H04L 67/12* (2013.01); *H04L 67/2804* (2013.01); *H04N 2201/3222* (2013.01); *H04N 2201/3236* (2013.01); *H04N 2201/3253* (2013.01); *H04N 2201/3277* (2013.01); *H04W 88/04* (2013.01)

(56) References Cited

U.S. PATENT DOCUMENTS

| | | | |
|---|---|---|---|
| 6,914,626 B2 | 7/2005 | Squibbs | |
| 7,512,398 B2 | 3/2009 | Chambers et al. | |
| 7,663,670 B1 | 2/2010 | Orboubadian | |
| 8,265,686 B2 * | 9/2012 | Klassen | G06F 17/3089 455/550.1 |
| 2004/0125208 A1 | 7/2004 | Malone et al. | |
| 2004/0153647 A1 * | 8/2004 | Rotholtz | H04N 7/18 713/176 |
| 2004/0186740 A1 | 9/2004 | Katsuta et al. | |
| 2007/0049250 A1 | 3/2007 | Chambers et al. | |
| 2007/0140487 A1 | 6/2007 | Meier et al. | |
| 2008/0239096 A1 | 10/2008 | Shasa | |
| 2010/0088522 A1 | 4/2010 | Barrus et al. | |
| 2013/0318476 A1 * | 11/2013 | Sauve | G06F 9/4443 715/835 |

OTHER PUBLICATIONS

Extended European Search Report; EP Application No. 12850676.3 / 2781080 PCT/FI2012051100; mailed Jul. 2, 2015; 6 pages.
Finnish Office Action; National Board of Patents and Registration of Finland; Application No. 20116125; mailed Mar. 9, 2012.
International Search Report; PCT/FI2012/051100; mailed Feb. 18, 2013.

* cited by examiner

METHOD AND APPARATUS FOR PROVIDING ENHANCED AUTHENTICITY FOR MULTIMEDIA DATA ITEM

TECHNICAL FIELD

The present application generally relates to a method and apparatus for providing enhanced authenticity for a multimedia data item.

BACKGROUND ART

A mobile apparatus may create multimedia data using, for example, camera and voice recording means for producing still images and/or streaming voice or video data. The mobile apparatus may also have some connectivity means for connecting the device to a network or to another device for uploading the captured images from the storage media of the camera to another storage media.

Services exist in networks, e.g. the Internet, for managing data, e.g. multimedia data, received from mobile apparatuses. The services are typically accessed via a web browser or using a client application made specifically for the purpose of accessing the service.

Mobile apparatuses are also connectable to devices such as cameras using a wired or wireless data communication means. The wired data communication means may be e.g. a USB (Universal Serial Bus) connection. The wireless data communication means may utilize be e.g. a Bluetooth or a Wireless LAN connection between the apparatus and the camera.

Because the professional data capture devices don't have proper means for executing service specific client software in the memory space of the device and they may also lack some means, e.g. location detection means such as GPS, for recording metadata useful for the captured multimedia data, a solution is needed for integrating the professional data capture devices to services that require a client software for e.g. producing metadata for the captured multimedia data. Furthermore, multimedia tagging based on the trustworthiness of the multimedia delivery path is needed.

SUMMARY

According to a first example aspect of the present disclosure there is provided an apparatus comprising:

a communication interface for receiving, over a transmission path, a multimedia data item associating captured multimedia data with metadata;

at least one processor; and at least one memory including computer program code; wherein the at least one memory and the computer program code configured to, with the at least one processor, cause the apparatus to:

define path information for the received multimedia data item based on the used transmission path; and store the path information to the multimedia data item for providing enhanced authenticity of the association between the metadata and the captured multimedia data.

In an embodiment, the path information comprises at least one of the following: a capture identifier (CI) for identifying a multimedia data capturing application; and a delivery identifier (DI) for identifying a multimedia data item delivering application.

Furthermore, a path identifier (PI) may be defined for identifying the used transmission path based on the at least one determined identifier. In an embodiment, the path identifier (PI) may be defined based on the metadata.

In an embodiment, the apparatus comprises at least one of the following: a user apparatus comprising a proprietary application; a multimedia device comprising an image sensor; and a computer apparatus comprising a messaging application. The user apparatus may capture multimedia data using the proprietary application and transmitting the multimedia data item using the proprietary application as the delivering application. The multimedia data item may be transmitted using the communication interface of the apparatus.

In an embodiment, the apparatus may comprise a server apparatus.

According to a second example aspect of the present disclosure there is provided a method for providing enhanced authenticity for a multimedia data item, the multimedia data item associating captured multimedia data with metadata, wherein the method comprising:

receiving the multimedia data item over a transmission path;

defining path information for the received multimedia data item based on the used transmission path; and storing the path information to the multimedia data item for providing enhanced authenticity of the association between the metadata and the captured multimedia data.

In an embodiment, the multimedia data is captured using at least one of the following:

proprietary multimedia capturing application of a user apparatus;

default multimedia capturing application of a user apparatus; and multimedia capturing application of a multimedia device.

The path information may be included as a part of the metadata of the multimedia data item. In an embodiment, the path information may be stored as a separate element in the multimedia data item.

In an embodiment, a first transmission path corresponds to multimedia data captured and delivered to a server apparatus by the propriety multimedia capturing application of the user apparatus. A second transmission path corresponds to multimedia data captured by the default multimedia capturing application of the user apparatus and delivered to the server apparatus by the propriety multimedia capturing application of the user apparatus. A third transmission path corresponds to multimedia data captured by the multimedia capturing application of the multimedia device and delivered to the server apparatus by the propriety multimedia capturing application of the user apparatus. A fourth transmission path corresponds to multimedia data captured by the multimedia capturing application of the multimedia device and delivered to the server apparatus by a messaging application.

A first class authenticity may be determined for the multimedia data item received over the first transmission path. A second class authenticity may be determined for the multimedia data item received over the second transmission path. A third class authenticity may be determined for the multimedia data item received over the third transmission path. A fourth class authenticity may be determined for the multimedia data item received over the fourth transmission path.

In an embodiment, the path information comprises at least one of the following:

a capture identifier (CI) for identifying a multimedia capturing application;

a delivery identifier (DI) for identifying a multimedia data item delivering application; and a path identifier (PI) for identifying the used transmission path.

According to a third example aspect of the present disclosure there is provided a computer program embodied on a computer readable medium comprising computer executable program code which, when executed by at least one processor of an apparatus, causes the apparatus to:

receive a multimedia data item associating captured multimedia data with metadata over a transmission path;

define path information for the received multimedia data item based on the used transmission path; and store the path information to the multimedia data item for providing enhanced authenticity of the association between the metadata and the captured multimedia data.

Different non-binding example aspects and embodiments of the present disclosure have been illustrated in the foregoing. The above embodiments are used merely to explain selected aspects or steps that may be utilized in implementations of the present disclosure. Some embodiments may be presented only with reference to certain example aspects of the present disclosure. It should be appreciated that corresponding embodiments may apply to other example aspects as well.

BRIEF DESCRIPTION OF THE DRAWINGS

The present disclosure will be described, by way of example only, with reference to the accompanying drawings, in which.

DETAILED DESCRIPTION

In the following description, like numbers denote like elements.

Figure 1:
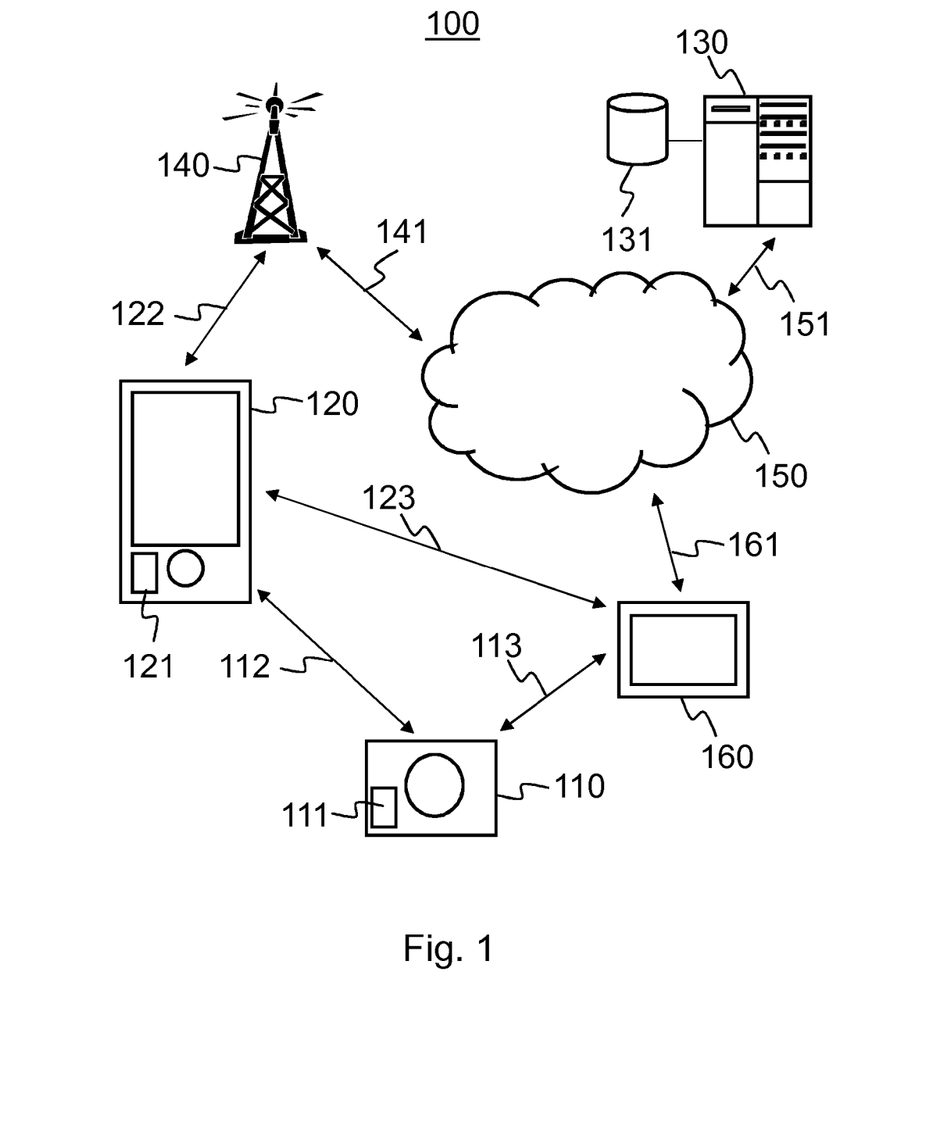
FIG. 1 shows a schematic picture of a system according to an example embodiment of the present disclosure.

FIG. 1 shows a schematic picture of a system 100 according to an example embodiment of the present disclosure. The system 100 comprises a multimedia device 110 configured to be capable of capturing multimedia, such as digital still images and/or video streams. The multimedia device 110 may comprise a storage 111 for multimedia data. The storage 111 may comprise a flash memory card, for example. The multimedia device 110 is configured to be connectable to a user apparatus 120 over a data connection 112. The data connection 112 may be a wired connection or a wireless connection. The wired connection may comprise Universal Serial Bus (USB), High-Definition Multimedia Interface (HDMI) or local area network (LAN), for example. The wireless connection may comprise Bluetooth™, Radio Frequency Identification (RF-ID) or wireless local area network (WLAN), for example.

The multimedia device 110 is configured to send captured multimedia data over the data connection 112 to the user apparatus 120. The multimedia device 110 may also be configured to send captured multimedia data over the data connection 113 to the computer apparatus 160. Such transmittal may be initiated by a user of the multimedia device 110, by a user of the computer apparatus 160, by a user of the user apparatus 120, or automatically based on settings. Such settings may comprise for example time of the day, amount of newly captured multimedia data or existence of the data connection 112, 113 for the multimedia device 110.

In an embodiment, the system 100 comprises a computer apparatus 160 configured to be connectable over a data connection 113. The data connection 113 may comprise any wired or wireless connection described for the connection 112 between the user apparatus 120 and the multimedia device 110. The computer apparatus 160 may be connected to a public data communication network 150, for example the Internet, over a data connection 161.

The user apparatus 120 may comprise a mobile phone, an internet tablet or a laptop computer, for example. The user apparatus 120 is capable of downloading and locally executing software program code. The software program code may be a client application of a service whose server application is running on the server apparatus 130 of the system 100. The user apparatus 120 may comprise multimedia capturing element, such as a camera, for capturing multimedia, such as still images or video streams, for example. The user apparatus 120 may also have a metadata element 121 for creating data usable as metadata of the multimedia content captured by the multimedia device 110. The metadata element 121 may comprise at least one of the following: a microphone, a positioning device for determining the current location of the user apparatus 120, and a clock. The user apparatus 120 is configured to be connectable to a wireless communication network 140 over a wireless connection 122. The wireless connection 122 may comprise a mobile cellular network or a wireless local area network (WLAN), for example. The wireless communication network may be to a public data communication network 150, for example the Internet, over a data connection 141.

In an embodiment, the user apparatus 120 is configured to be connectable to the computer apparatus 160 over a data connection 123. The data connection 123 may comprise any wired or wireless connection described for the connection 112 between the user apparatus 120 and the multimedia device 110.

In an embodiment, the system 100 comprises a server apparatus 130, which comprises a storage device 131 for storing multimedia and metadata received over a data connection 151.

In an embodiment, multimedia data captured by a user may travel to a server apparatus 130 over different paths. A first path may comprise sending multimedia data captured by a proprietary application of a user apparatus 120 over a wireless communication network 122, 140, 141 and public data communication network 150, 151 to the server apparatus 130. A second path may comprise sending multimedia data captured by a default application of a user apparatus 120 over a wireless communication network 122, 140, 141 and public data communication network 150, 151 to the server apparatus 130. A third path may comprise sending multimedia data captured by a multimedia device 110 to the user apparatus 120 and therefrom over a wireless communication network 122, 140, 141 and public data communication network 150, 151 to the server apparatus 130. A fourth path may comprise sending multimedia data captured by the multimedia device 110 to the computer apparatus 160 and therefrom over the public data communication network 150, 151, 161 to the server apparatus 130.

In an embodiment, the proprietary application in the user apparatus 120 may be a client application of a service whose server application is running on the server apparatus 130 of the system 100. The proprietary application may capture the multimedia data for the first path. Also metadata for the captured multimedia may be retrieved by the proprietary application from the metadata elements 121 of the user apparatus 120. The default application may be an imaging application of the user apparatus 120. For the second path, the multimedia data captured by the default application may be imported to the proprietary application before transmitting to the server apparatus 130. The proprietary application may check the multimedia data and extract and apply metadata for the multimedia data. For the third path, the multimedia may be captured by the multimedia device 110 and transmitted to the proprietary application of the user apparatus 120 for sending to the server apparatus 130. The proprietary application may check the multimedia data and extract and apply metadata for the multimedia data. User may provide additional metadata using the user apparatus 120. For the fourth path, the multimedia may be captured by the multimedia device 110 and transmitted to a communication application of a computer apparatus 160. The communication application may check the multimedia data and extract and apply metadata for the multimedia data. User may provide additional metadata using the computer apparatus 160. In a further embodiment, the user may access the multimedia data on the server apparatus and provide additional metadata.

Figure 2:
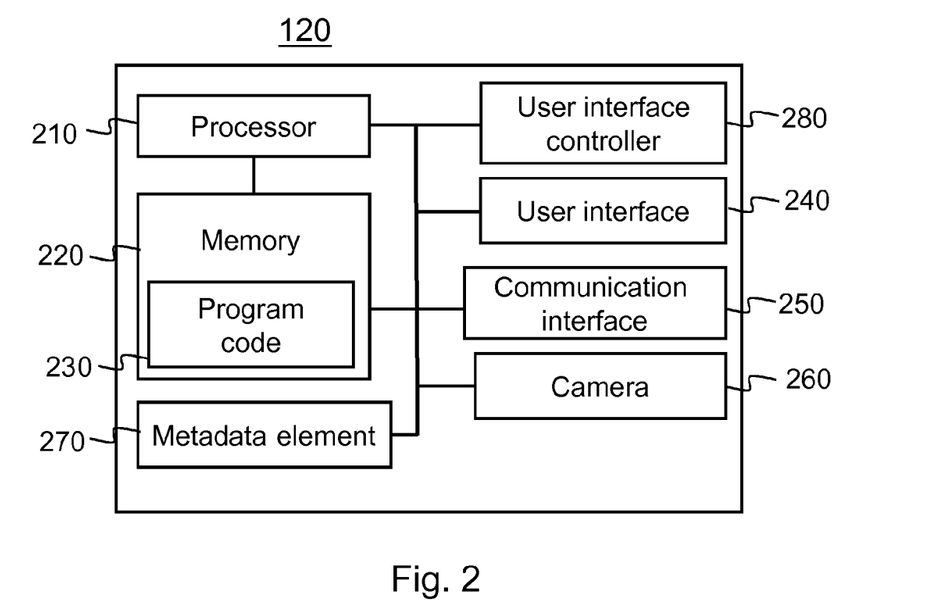
FIG. 2 presents an example block diagram of a user apparatus in which various embodiments of the present disclosure may be applied.

FIG. 2 presents an example block diagram of a user apparatus 120 in which various embodiments of the present disclosure may be applied. The user apparatus 120 may be a user equipment (UE), user device or apparatus, such as a mobile terminal, a smart phone or other communication device.

The general structure of the user apparatus 120 comprises a user interface 240, a communication interface 240, a metadata element 270, a camera, a processor 210, and a memory 220 coupled to the processor 210. The user apparatus 120 further comprises software 230 stored in the memory 220 and operable to be loaded into and executed in the processor 210. The software 230 may comprise one or more software modules and can be in the form of a computer program product. The user apparatus 210 may further comprise a user interface controller 280.

The processor 210 may be, e.g., a central processing unit (CPU), a microprocessor, a digital signal processor (DSP), a graphics processing unit, or the like. FIG. 2 shows one processor 210, but the user apparatus 120 may comprise a plurality of processors.

The memory 220 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The user apparatus 120 may comprise a plurality of memories. The memory 220 may be constructed as a part of the user apparatus 120 or it may be inserted into a slot, port, or the like of the user apparatus 120 by a user. The memory 220 may serve the sole purpose of storing data, or it may be constructed as a part of an apparatus serving other purposes, such as processing data. A proprietary multimedia application, a default multimedia application and multimedia data may be stored to the memory 220.

The user interface controller 280 may comprise circuitry for receiving input from a user of the user apparatus 120, e.g., via a keyboard, graphical user interface shown on the display of the user interfaces 240 of the user apparatus 120, speech recognition circuitry, or an accessory device, such as a headset, and for providing output to the user via, e.g., a graphical user interface or a loudspeaker.

The metadata element 270 comprises element configured to provide metadata information. Such elements may comprise, for example, a positioning device, an accelerometer, a temperature gauge, a clock or a microphone.

The camera 260 may be a still image camera or a video stream camera, capable for creating multimedia data.

The communication interface module 250 implements at least part of radio transmission. The communication interface module 250 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 250 may be integrated into the user apparatus 120, or into an adapter, card or the like that may be inserted into a suitable slot or port of the user apparatus 120. The communication interface module 250 may support one radio interface technology or a plurality of technologies. The user apparatus 12 may comprise a plurality of communication interface modules 250. Captured multimedia may be transmitted to a wireless communication network 140 using the communication interface 250.

A skilled person appreciates that in addition to the elements shown in FIG. 2, the user apparatus 120 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the user apparatus 120 may comprise a disposable or rechargeable battery (not shown) for powering when external power if external power supply is not available.

In an embodiment, the user apparatus 120 comprises speech recognition means. Using these means, a pre-defined phrase may be recognized from the speech and translated into a metadata tag. This tag may then be used as any other metadata, for example for characterizing the captured multimedia or for grouping images together, for example.

Figure 3:
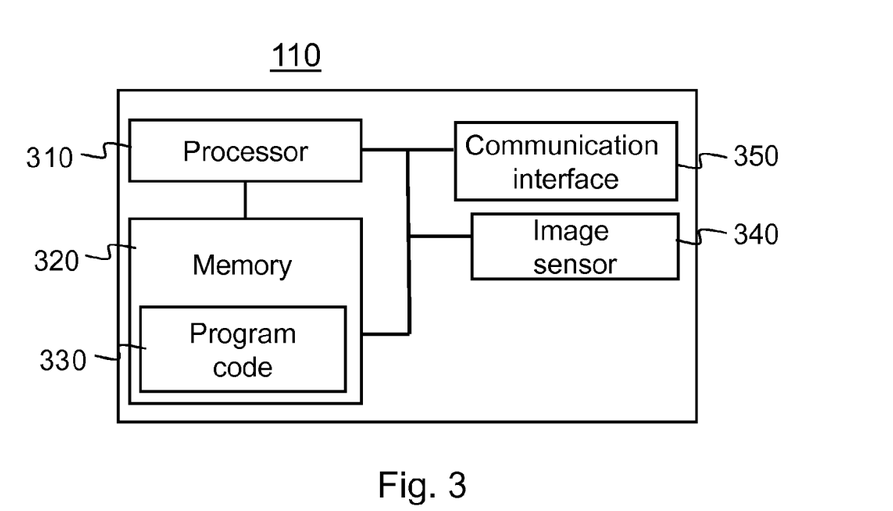
FIG. 3 presents an example block diagram of a multimedia device in which various embodiments of the present disclosure may be applied.

FIG. 3 presents an example block diagram of a multimedia device 110 in which various embodiments of the present disclosure may be applied. The multimedia device 110 may be a digital still camera or digital video camera, for example.

The general structure of the multimedia device 110 comprises a processor 310, and a memory 320 coupled to the processor 310. The multimedia device 110 further comprises software 330 stored in the memory 320 and operable to be loaded into and executed in the processor 310. The software 330 may comprise one or more software modules and can be in the form of a computer program product.

The processor 310 may be, e.g., a central processing unit (CPU), a microprocessor, a digital signal processor (DSP), a graphics processing unit, or the like. FIG. 3 shows one processor 310, but the multimedia device 110 may comprise a plurality of processors.

The memory 320 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The multimedia device 110 may comprise a plurality of memories. The memory 320 may be constructed as a part of the multimedia device 110 or it may be inserted into a slot, port, or the like of the multimedia device 110 by a user. The memory 320 may serve the sole purpose of storing data, or it may be constructed as a part of an apparatus serving other purposes, such as processing data.

The image sensor may be a device converting an optical image into an electronic signal, for example a charge-coupled device (CCD) or a complementary metal-oxide-semiconductor (CMOS) active pixel sensor.

The communication interface module 350 implements at least part of radio transmission. The communication interface module 350 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 350 may be integrated into the multimedia device 110, or into an adapter, card or the like that may be inserted into a suitable slot or port of the multimedia device 110. The communication interface module 350 may support one radio interface technology or a plurality of technologies. The multimedia device 110 may comprise a plurality of communication interface modules 350. Captured multimedia data of the multimedia device 110 may be transmitted to a user apparatus 120 or to a computer apparatus 160 using the communication interface 350.

Figure 4:
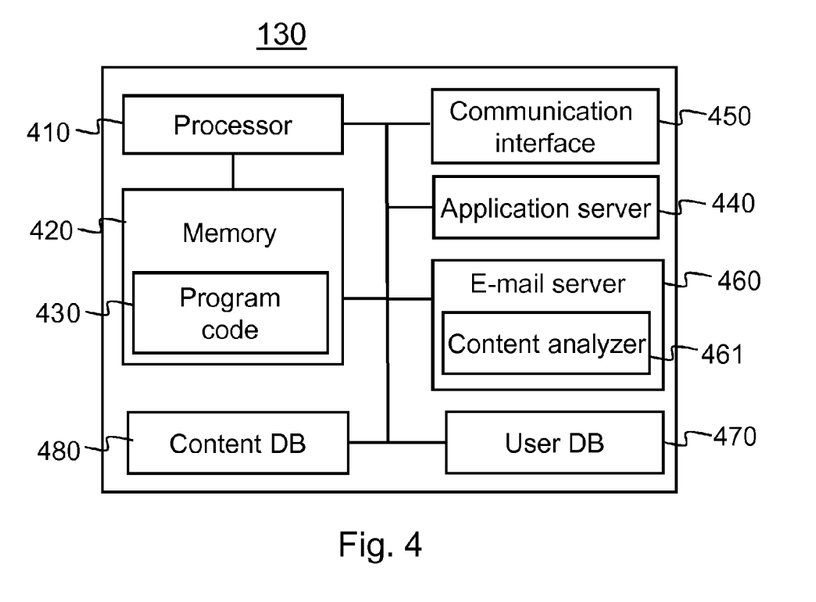
FIG. 4 presents an example block diagram of a server apparatus in which various embodiments of the present disclosure may be applied.

A skilled person appreciates that in addition to the elements shown in FIG. 3, the multimedia device 110 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the multimedia device 110 may comprise a disposable or rechargeable battery (not shown) for powering when external power if external power supply is not available FIG. 4 presents an example block diagram of a server apparatus 130 in which various embodiments of the present disclosure may be applied.

The general structure of the server apparatus 130 comprises a processor 410, and a memory 420 coupled to the processor 410. The server apparatus 130 further comprises software 430 stored in the memory 420 and operable to be loaded into and executed in the processor 410. The software 430 may comprise one or more software modules and can be in the form of a computer program product.

The processor 410 may be, e.g., a central processing unit (CPU), a microprocessor, a digital signal processor (DSP), a graphics processing unit, or the like. FIG. 4 shows one processor 410, but the server apparatus 130 may comprise a plurality of processors.

The memory 420 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The server apparatus 130 may comprise a plurality of memories. The memory 420 may be constructed as a part of the server apparatus 130 or it may be inserted into a slot, port, or the like of the server apparatus 130 by a user. The memory 420 may serve the sole purpose of storing data, or it may be constructed as a part of an apparatus serving other purposes, such as processing data.

The communication interface module 450 implements at least part of radio transmission. The communication interface module 450 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 450 may be integrated into the server apparatus 130, or into an adapter, card or the like that may be inserted into a suitable slot or port of the server apparatus 130. The communication interface module 450 may support one radio interface technology or a plurality of technologies. The multimedia device 110 may comprise a plurality of communication interface modules 450. Captured multimedia data of the multimedia device 110 or the user apparatus 120 may be received by the server apparatus 130 using the communication interface 450.

The e-mail server process 460, which receives e-mail messages sent from user apparatuses 120 and computer apparatuses 160 via the network 150. The server 460 may comprise a content analyzer module 461, which checks if the content of the received message meets the criteria that are set for new content data of the service. The content analyzer module 461 may for example check, whether the e-mail message contains a valid still image or a video stream. The valid content data received by the e-mail server is then sent to an application server 440, which provides application services e.g. relating to the user accounts stored in a user database 470 and content of the content management service. Content provided by the service system 100 is stored in a content database 480.

A skilled person appreciates that in addition to the elements shown in FIG. 4, the server apparatus 130 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 5:
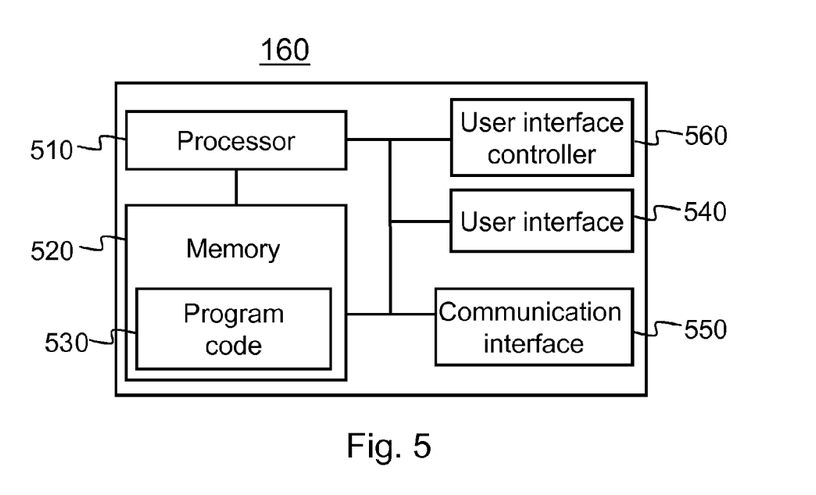
FIG. 5 presents an example block diagram of a computer apparatus in which various embodiments of the present disclosure may be applied.

FIG. 5 presents an example block diagram of a computer apparatus 160 in which various embodiments of the present disclosure may be applied. The computer apparatus 160 may be a user equipment (UE), user device or apparatus, such as a mobile terminal, a smart phone, a laptop computer, a desktop computer or other communication device.

The general structure of the computer apparatus 160 comprises a user interface 540, a communication interface 550, a processor 510, and a memory 520 coupled to the processor 510. The computer apparatus 160 further comprises software 530 stored in the memory 520 and operable to be loaded into and executed in the processor 510. The software 530 may comprise one or more software modules and can be in the form of a computer program product. The computer apparatus 160 may further comprise a user interface controller 560.

The processor 510 may be, e.g., a central processing unit (CPU), a microprocessor, a digital signal processor (DSP), a graphics processing unit, or the like. FIG. 5 shows one processor 510, but the computer apparatus 160 may comprise a plurality of processors.

The memory 520 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The computer apparatus 160 may comprise a plurality of memories. The memory 520 may be constructed as a part of the computer apparatus 160 or it may be inserted into a slot, port, or the like of the computer apparatus 160 by a user. The memory 520 may serve the sole purpose of storing data, or it may be constructed as a part of an apparatus serving other purposes, such as processing data.

The user interface controller 560 may comprise circuitry for receiving input from a user of the computer apparatus 160, e.g., via a keyboard, graphical user interface shown on the display of the user interfaces 240 of the computer apparatus 160, speech recognition circuitry, or an accessory device, such as a headset, and for providing output to the user via, e.g., a graphical user interface or a loudspeaker.

The communication interface module 550 implements at least part of radio transmission. The communication interface module 550 may comprise, e.g., a wireless or a wired interface module. The wireless interface may comprise such as a WLAN, Bluetooth, infrared (IR), radio frequency identification (RF ID), GSM/GPRS, CDMA, WCDMA, or LTE (Long Term Evolution) radio module. The wired interface may comprise such as universal serial bus (USB), for example. The communication interface module 550 may be integrated into the computer apparatus 160, or into an adapter, card or the like that may be inserted into a suitable slot or port of the computer apparatus 160. The communication interface module 550 may support one radio interface technology or a plurality of technologies. The computer apparatus 160 may comprise a plurality of communication interface modules 550. Captured multimedia that is received from the multimedia device 110 or the user apparatus 120 may be transmitted via the public data network 150 to the server apparatus 130.

Figure 6A:
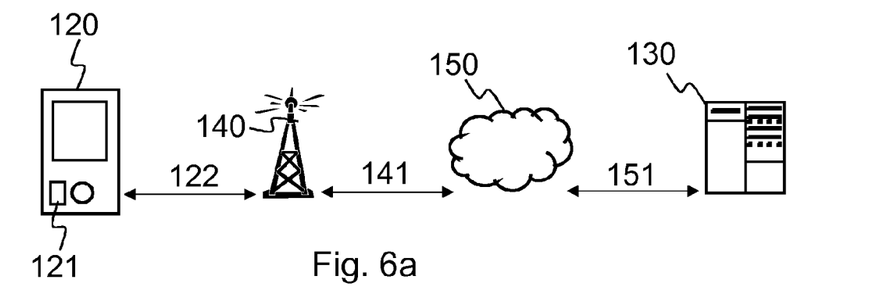
FIGS. 6a-c show schematic pictures of different transmission paths according to an example embodiment of the present disclosure.
Figure 6B:
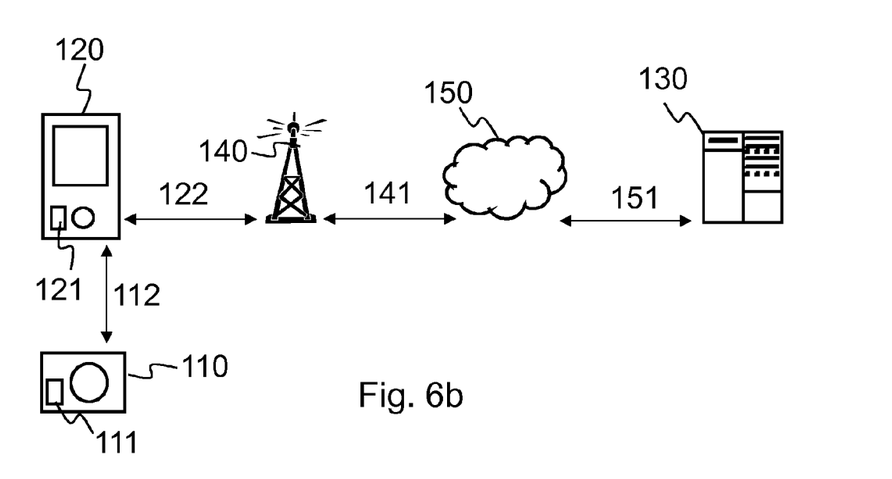
Figure 6C:
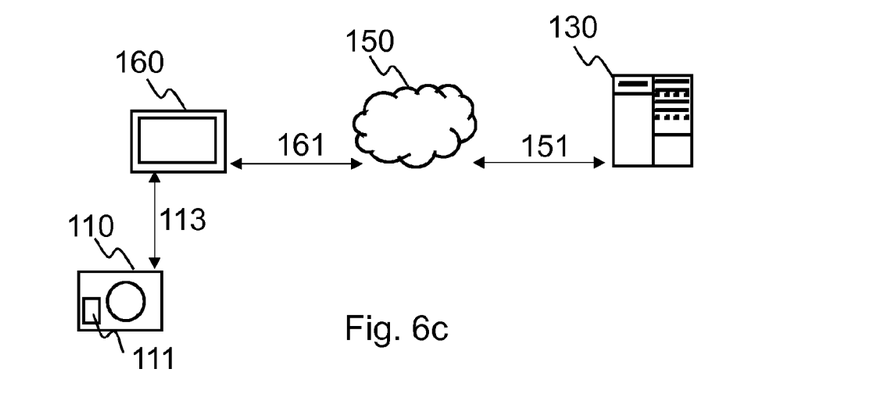

A skilled person appreciates that in addition to the elements shown in FIG. 5, the computer apparatus 160 may comprise other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the computer apparatus 160 may comprise a disposable or rechargeable battery (not shown) for powering when external power if external power supply is not available FIGS. 6a-c show schematic pictures of different transmission paths according to an example embodiment of the present disclosure. In FIG. 6a, multimedia, such as an image for example, is captured using a proprietary photo application of a user apparatus 120. The propriety application ensures the integrity of the captured multimedia for the delivery path 122, 141, 151 from camera hardware of the user apparatus 120 all the way to a server apparatus 130 of a brokering system. Also, a critical part of multimedia metadata (e.g. location and time) may be retrieved automatically from the metadata element 121 by the proprietary application and attached to the multimedia data to provide a multimedia data item.

In an embodiment, multimedia, such as an image for example, is captured using a default camera application of the user apparatus 120 and imported to the proprietary application. The proprietary photo application may check the captured multimedia file and try to automatically extract as much multimedia metadata as possible. The proprietary photo application may further apply various technical checks to ensure that the multimedia is captured by the user apparatus 120 rather than transferred from another system to the user apparatus 121. Such checking may also comprise evaluation of the possible editing of the captured multimedia. After that, the multimedia may be delivered to a server apparatus 130 of a brokering system. The propriety application ensures the integrity of the captured multimedia for the delivery path 122, 141, 151 from camera hardware of the user apparatus 120 all the way to the server apparatus 130 of a brokering system.

In FIG. 6b, multimedia, such as an image for example, is captured using a multimedia device 110, stored to a storage 111, and transferred to a user apparatus 120 over a data connection 112. A proprietary multimedia application of the user apparatus 120 may extract available metadata from the captured multimedia. Furthermore, the user may provide additional metadata as needed. In an embodiment, the metadata element 121 of the user apparatus 120 may also provide additional metadata for the captured multimedia. After attaching available metadata to the multimedia, the multimedia may be delivered to a server apparatus 130 of a brokering system. The propriety application ensures the integrity of the captured multimedia for the delivery path 122, 141, 151 from camera hardware of the user apparatus 120 all the way to the server apparatus 130 of the brokering system.

In FIG. 6c, multimedia, such as an image for example, is captured using a multimedia device 110, stored to a storage 111, and transferred to a computer apparatus 160 over a data connection 113. A default communication application of the computer apparatus 160 may receive the captured multimedia and deliver the multimedia to a server apparatus 130 of a brokering system over a data connection 151, 161. The default communication application may comprise for example at least one of the following: An e-mail application, a file transfer application, and a browser-based download application. Metadata may not be extracted from the captured multimedia, nor added by a user of the computer apparatus 160 while delivering the multimedia to the server apparatus 130. However, the multimedia metadata may be extracted from the multimedia data by the server apparatus 130 of the brokering system and additional metadata may be provided for the multimedia data by the user. The user may be provided registration information for the server apparatus 130 to gain access to the server apparatus 130. Using such registration information the user can add metadata to the captured and delivered multimedia data in the server apparatus 130 by accessing the server apparatus 130 using the computer apparatus 160 over data connection 151, 161, for example. Naturally, the user may access the multimedia data in the server apparatus 130 using the user apparatus 120 in similar fashion, in order to add metadata.

In an embodiment, path information is defined for received multimedia data item at a server apparatus 130 based on a used transmission path and metadata attached to the multimedia data providing the multimedia data item. The path information is attached to the multimedia data item for providing enhanced authenticity of the association between the metadata and the originally captured multimedia data. The attached path information for an entire lifetime of the multimedia data item enables another user interested in the multimedia to use the path information for estimating whether to trust the authenticity of the multimedia or not. Such feature is useful for example in a system, where a user may deliver captured multimedia from a user apparatus 120 or a multimedia device 110 to the server apparatus 130 of the brokering system for other users. The interested user would prefer knowing the level of authenticity for the multimedia before downloading the multimedia and paying for it. The multimedia may comprise for example still images or video streams and may relate to at least one of the following: Breaking news multimedia, interesting person related multimedia, geographical place multimedia, sports multimedia, weather multimedia and culture related multimedia.

Figure 7:
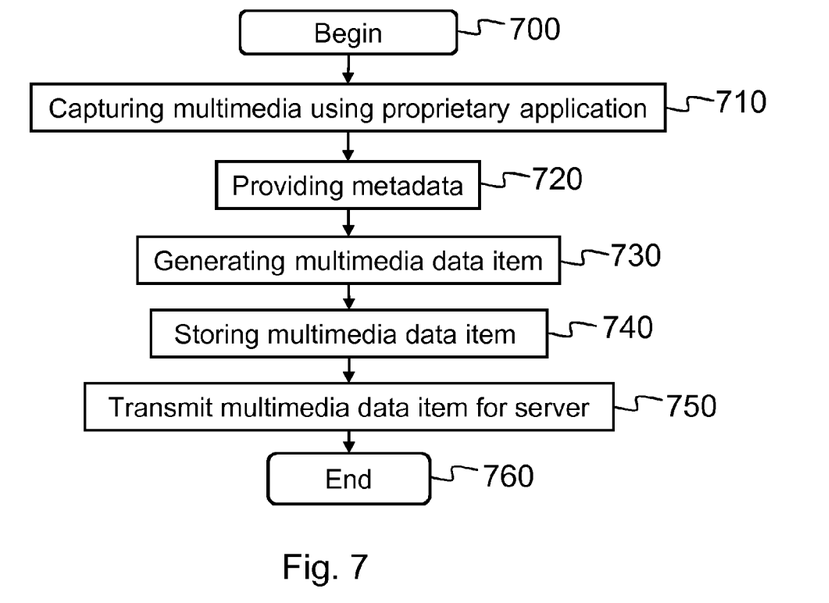
FIG. 7 shows a flow diagram showing operations in accordance with an example embodiment of the present disclosure.

FIG. 7 shows a flow diagram showing operations in accordance with an example embodiment of the present disclosure. In step 700, the method is started. In step 710, multimedia data, e.g. a digital still picture or a video stream, is captured using a proprietary application of a user apparatus 120. In step 720, metadata for the captured multimedia is provided by a metadata element 121 for the proprietary application. A multimedia data item is generated using the captured multimedia data and the provided metadata in step 730. In step 740, the multimedia data item is stored in a memory of the user apparatus 120. The multimedia item is transmitted for a server apparatus 130 in step 750. The method is ended in step 760.

Figure 8:
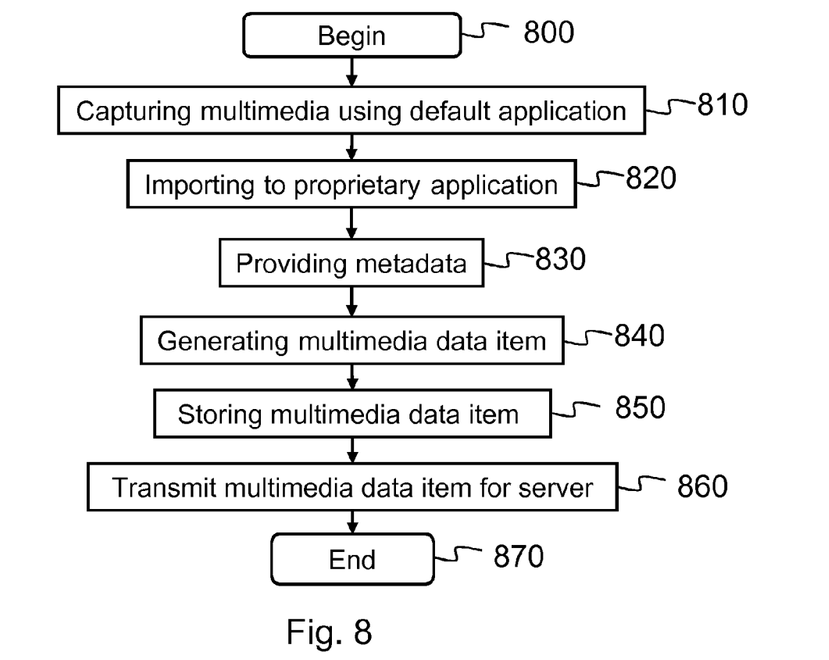
FIG. 8 shows a flow diagram showing operations in accordance with an example embodiment of the present disclosure.

FIG. 8 shows a flow diagram showing operations in accordance with an example embodiment of the present disclosure. In step 800, the method is started. In step 810, multimedia data, e.g. a digital still picture or a video stream, is captured using a default application of a user apparatus 120. In step 820, the captured multimedia is imported to a proprietary application of the user apparatus 120. Metadata for the captured multimedia is provided by a metadata element 121 for the proprietary application in step 830. A multimedia data item is generated using the captured multimedia data and the provided metadata in step 840. In step 850, the multimedia data item is stored in a memory of the user apparatus 120. The multimedia item is transmitted for a server apparatus 130 in step 860. The method is ended in step 870.

Figure 9:
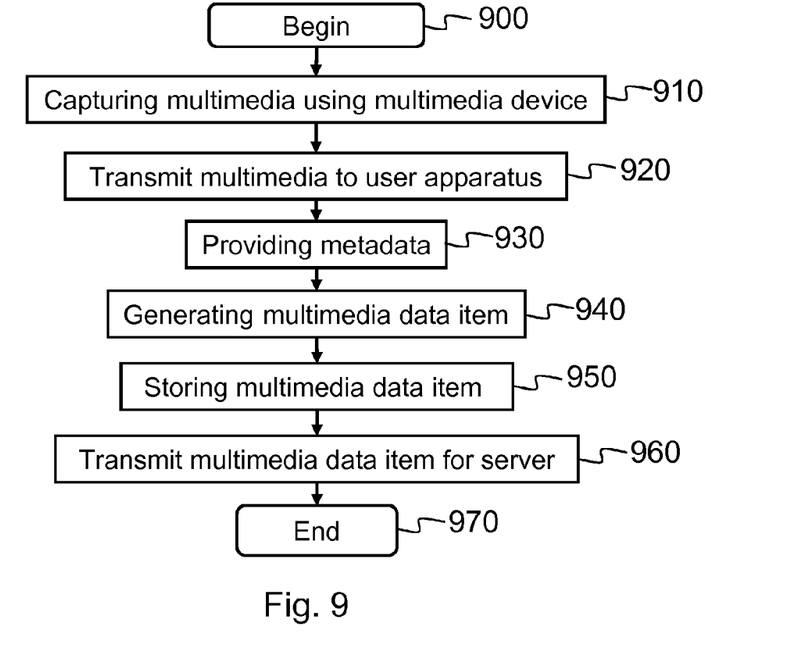
FIG. 9 shows a flow diagram showing operations in accordance with an example embodiment of the present disclosure.

FIG. 9 shows a flow diagram showing operations in accordance with an example embodiment of the present disclosure. In step 900, the method is started. In step 910, multimedia data, e.g. a digital still picture or a video stream, is captured using a default application of a multimedia device 110 and stored to a storage 111. In step 920, the captured multimedia is transmitted to a proprietary application of the user apparatus 120 over a data connection 112. Metadata for the captured multimedia may be extracted by the proprietary application in step 930. Furthermore, a user may provide additional metadata for the captured multimedia using the user apparatus 120. A multimedia data item is generated using the captured multimedia data and the provided metadata in step 940. In step 950, the multimedia data item is stored in a memory of the user apparatus 120. The multimedia item is transmitted for a server apparatus 130 in step 960. The method is ended in step 970.

Figure 10:
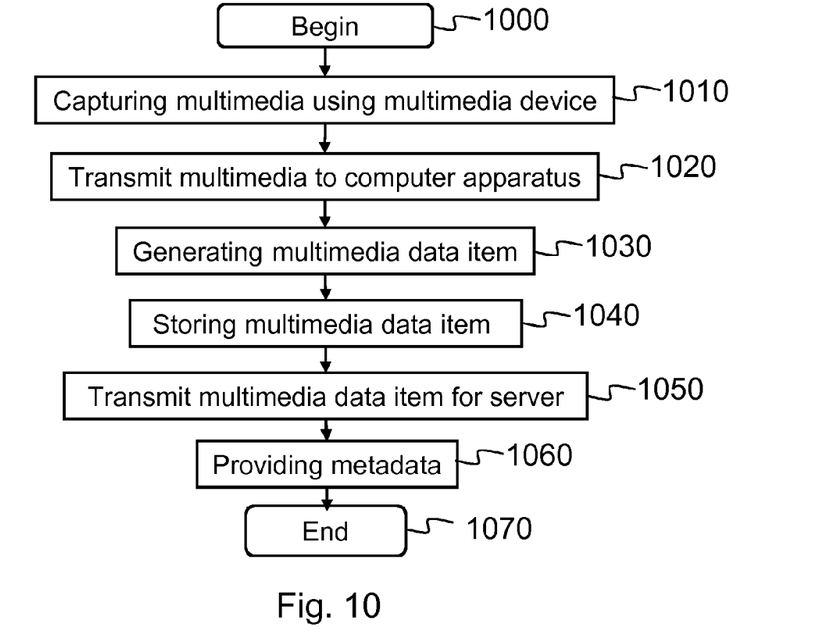
FIG. 10 shows a flow diagram showing operations in accordance with an example embodiment of the present disclosure.

FIG. 10 shows a flow diagram showing operations in accordance with an example embodiment of the present disclosure. In step 1000, the method is started. In step 1010, multimedia data, e.g. a digital still picture or a video stream, is captured using a default application of a multimedia device 110 and stored to a storage 111. In step 1020, the captured multimedia is transmitted to a computer apparatus 160 over a data connection 113. A multimedia data item is generated using the captured multimedia data and the attached metadata in step 1030. In step 1040, the multimedia data item is stored in a memory of the computer apparatus 160. The multimedia item is transmitted for a server apparatus 130 in step 1050. In step 1060, the user may provide further metadata for the captured multimedia using the computer apparatus 160 over the network 150, 151, 161. The method is ended in step 1070.

Figure 11:
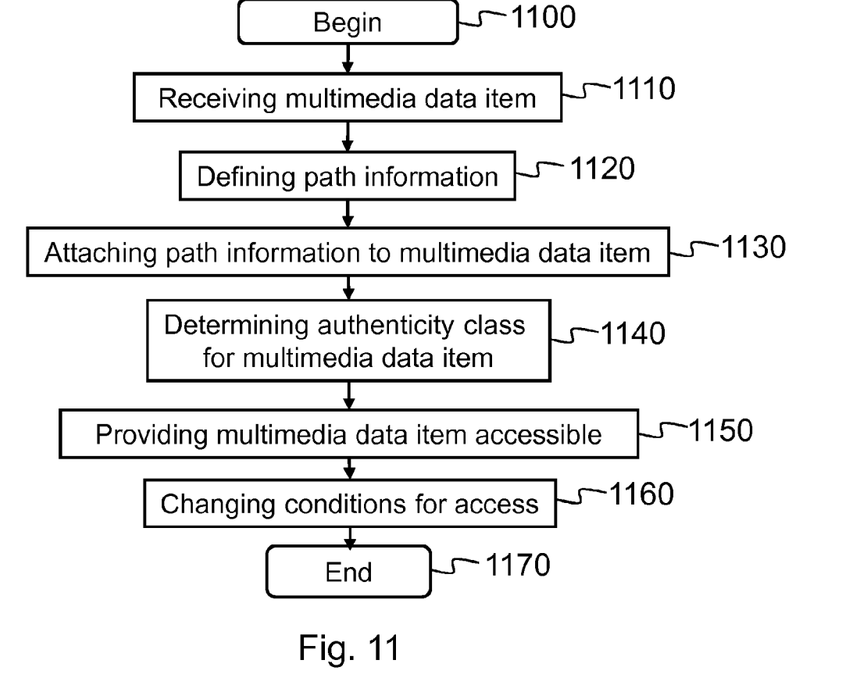
FIG. 11 shows a flow diagram showing operations in accordance with an example embodiment of the present disclosure.

FIG. 11 shows a flow diagram showing operations in accordance with an example embodiment of the present disclosure. In step 1100, the method is started. In step 1110, multimedia data item is received at a server apparatus 130 over a transmission path. In step 1120, path information is defined for the received multimedia data item based on the used transmission path and the metadata. The path information is attached to the multimedia data item for providing enhanced authenticity of the association between the metadata and the captured multimedia data in step 1130. An authenticity class for the multimedia item is determined based on the path information in step 1140. Providing the multimedia data item accessible for users from the server apparatus 130 associated with the determined authenticity class. In step 1160, the server apparatus 130 may provide the multimedia items accessible for users with different conditions based on the authenticity class of the multimedia items. The method is ended in step 1170.

Figure 12:
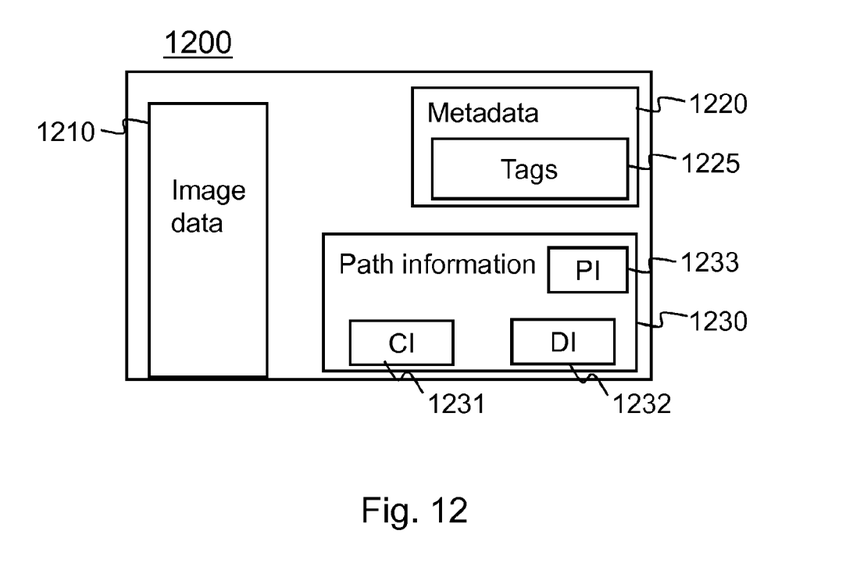
FIG. 12 shows an overall block diagram of an example multimedia data item according to an example embodiment of the present disclosure.

FIG. 12 shows an overall block diagram of an example multimedia data item 1200 according to an example embodiment of the present disclosure. The multimedia data item 1200 comprises multimedia data 1210, such as image data. Furthermore, the multimedia data item 1200 comprises metadata 1220. In an embodiment, the multimedia data item 1200 may also comprise separate path information 1230 for the multimedia data item 1200 for providing enhanced authenticity of the association between the metadata and the captured multimedia data. The path information 1230 is configured to provide information of the delivery path of the multimedia data item 1200 from capturing phase of the multimedia data to the storing phase at the server.

In an embodiment, the path information 1230 may be included in the metadata 1220, for example as a tag 1225. Hence, no separate path information element 1230 is needed in the multimedia data item 1200.

The metadata 1220 may be written into the multimedia data item 1200 for identifying who owns the multimedia data 1210, copyright & contact information, what camera created the file, along with exposure information and descriptive information such as keywords about the photo, making the file searchable on the computer and/or the Internet. Some metadata 1220 is written by the camera and further metadata 1220 may be input by the photographer, user and/or computer software after downloading the multimedia data 1210 to a computer.

The metadata 1220 may be configured to use a certain standard format, such as Exchangeable Image Format (EXIF). Specifically, FIG. 12 illustrates a single digital image 1200 stored in the EXIF format, such as in a file on a computer or on a removable media device in a digital camera. As will be appreciated by those skilled in the art, an EXIF file 1200 may contain multiple digital images having a similar format. The metadata 1220 may also comprise at least two metadata, for example simple metadata and complex metadata. In FIG. 12 only a single metadata 1220 is showed, for simplicity. The metadata 1220 may include tags 1225. The tags include information such as descriptions, copyright information, date and time information, camera settings such as camera model and make, and information that varies with each image such as orientation (rotation), aperture, shutter speed, focal length, metering mode, location information, and ISO speed information. The tags 1225 may further comprise a thumbnail for previewing the picture on the camera's LCD screen, in file managers, or in photo manipulation software.

The metadata 1220 format may comprise standard tags 1225 for location information. Cameras and mobile phones may have a built-in GPS receiver that stores the location information in the metadata tags 1225 when the picture is taken. Some other cameras have a separate GPS receiver that fits into the flash connector, for example. Recorded GPS data can also be added to any digital photograph on a computer, either by correlating the time stamps of the photographs with a GPS record from a hand-held GPS receiver or manually using a map or mapping software. The process of adding geographic information to a photograph is known as geocoding. A system server may allow their users to upload geocoded pictures or to add geolocation information online.

In an embodiment, the metadata 1220 may be configured to use any other standard format, such as:
IPTC Information Interchange Model IIM (International Press Telecommunications Council),
IPTC Core Schema for XMP,
XMP—Extensible Metadata Platform (an Adobe standard),
Dublin Core (Dublin Core Metadata Initiative—DCMI), or
PLUS (Picture Licensing Universal System).

The path information 1230 may comprise information of the used delivery path of the multimedia data item 1200, as described earlier in this application. The path information 1230 may comprise tag for at least one of the following: path1, path2, path3 and path4.

In an embodiment, the path information 1230 may comprise path information elements, such as a capture identifier (CI) 1231 and a delivery identifier (DI) 1232, for identifying the four different paths of FIGS. 6a-c. The capture identifier (CI) 1231 may comprise at least one of the following alternatives for the capturing application:
"Proprietary" for proprietary application,
"Default" for default application, and
"External" for any external application.

The delivery identifier (DI) 1232 may comprise at least one of the following alternatives for the delivering application transmitting the multimedia data item:
"Proprietary" for proprietary application, and
"Other" for any other application.

In an embodiment, for FIG. 6a, multimedia, such as an image for example, may be captured using a proprietary photo application of a user apparatus 120. The capture identifier (CI) 1231 may be thus set to "Proprietary". The propriety application also ensures the integrity of the captured multimedia for the delivery path 122, 141, 151 from camera hardware of the user apparatus 120 all the way to a server apparatus 130 of a brokering system. Hence, the delivery identifier (DI) 1232 may be set to "Proprietary". Also, a critical part of multimedia metadata (e.g. location and time) may be retrieved automatically from the metadata element 121 by the proprietary application and attached to the multimedia data to provide a multimedia data item.

In an embodiment, multimedia, such as an image for example, is captured using a default camera application of the user apparatus 120 and imported to the proprietary application. The capture identifier (CI) 1231 may be thus set to "Default". The proprietary photo application may check the captured multimedia file and try to automatically extract as much multimedia metadata as possible. The proprietary photo application may further apply various technical checks to ensure that the multimedia is captured by the user apparatus 120 rather than transferred from another system to the user apparatus 121. Such checking may also comprise evaluation of the possible editing of the captured multimedia. After that, the multimedia may be delivered to a server apparatus 130 of a brokering system by the proprietary application. Hence, the delivery identifier (DI) 1232 may be set to "Proprietary". The propriety application ensures the integrity of the captured multimedia for the delivery path 122, 141, 151 from camera hardware of the user apparatus 120 all the way to the server apparatus 130 of a brokering system.

In an embodiment, for FIG. 6b, multimedia, such as an image for example, is captured using a multimedia device 110, stored to a storage 111, and transferred to a user apparatus 120 over a data connection 112. The capture identifier (CI) 1231 may be thus set to "External". A proprietary multimedia application of the user apparatus 120 may extract available metadata from the captured multimedia. Furthermore, the user may provide additional metadata as needed. In an embodiment, the metadata element 121 of the user apparatus 120 may also provide additional metadata for the captured multimedia. After attaching available metadata to the multimedia, the multimedia may be delivered to a server apparatus 130 of a brokering system using the proprietary application, for example. Hence, the delivery identifier (DI) 1232 may be set to "Proprietary". The propriety application ensures the integrity of the captured multimedia for the delivery path 122, 141, 151 from camera hardware of the user apparatus 120 all the way to the server apparatus 130 of the brokering system.

In an embodiment, for FIG. 6c, multimedia, such as an image for example, is captured using a multimedia device 110, stored to a storage 111, and transferred to a computer apparatus 160 over a data connection 113. The capture identifier (CI) 1231 may be thus set to "External". A default communication application of the computer apparatus 160 may receive the captured multimedia and deliver the multimedia to a server apparatus 130 of a brokering system over a data connection 151, 161. Hence, the delivery identifier (DI) 1232 may be set to "Other". The default communication application may comprise for example at least one of the following: An e-mail application, a file transfer application, and a browser-based download application. Metadata may not be extracted from the captured multimedia, nor added by a user of the computer apparatus 160 while delivering the multimedia to the server apparatus 130. However, the multimedia metadata may be extracted from the multimedia data by the server apparatus 130 of the brokering system and additional metadata may be provided for the multimedia data by the user. The user may be provided registration information for the server apparatus 130 to gain access to the server apparatus 130. Using such registration information the user can add metadata to the captured and delivered multimedia data in the server apparatus 130 by accessing the server apparatus 130 using the computer apparatus 160 over data connection 151, 161, for example. Naturally, the user may access the multimedia data in the server apparatus 130 using the user apparatus 120 in similar fashion, in order to add metadata.

In an embodiment, the path information 1230 comprises a path identifier (PI) 1233 that is defined for a received multimedia data item at a server apparatus 130 based on a used transmission path and metadata attached to the multimedia data providing the multimedia data item. The path identifier (PI) 1233 is attached to the multimedia data item for providing enhanced authenticity of the association between the metadata and the originally captured multimedia data. The attached path identifier (PI) 1233 enables another user interested in the multimedia to use the path information for estimating whether to trust the authenticity of the multimedia or not, for an entire lifetime of the multimedia data item. Such feature is useful for example in a system, where a user may deliver captured multimedia from a user apparatus 120 or a multimedia device 110 to the server apparatus 130 of the brokering system for other users. The interested user would prefer knowing the level of authenticity for the multimedia before downloading the multimedia and paying for it. The path identifier (PI) 1233 may be defined, for example, based on following mapping:

| PI | "path1" | "path2" | "path3" | "path4" |
|----|---------|---------|---------|---------|
| CI | "Proprietary" | "Default" | "External" | "External" |
| DI | "Proprietary" | "Proprietary" | "Proprietary" | "Other" |

The path identifier (PI) 1233, may be defined using the metadata 1220, in one example embodiment. Furthermore, the path information 1233, or at least one of the following elements: CI 1231, DI 1232 and PI 1233 may be located in the metadata 1220, for example as separate tags 1225. Part of the path information 1230 may be defined before the multimedia data item 1200 is received at the server 130, for example the CI 1231 and the DI 1232, by at least one of the following: the user apparatus 120, the multimedia device 110, and the computer apparatus 160. In an embodiment, at least part of the path information 1233 may be defined at the server 130, when receiving the multimedia data item 1200 and defining the path information 1230 using the metadata 1220. In an embodiment, only the path identifier 1233 of the path information 1230 is defined by the server 130. The path identifier 1233 may be defined based on at least one of the following: the path information 1230 and the metadata 1220.

Various embodiments have been presented. It should be appreciated that in this document, words comprise, include and contain are each used as open-ended expressions with no intended exclusivity. If desired, the different functions discussed herein may be performed in a different order and/or concurrently with each other. Furthermore, if desired, one or more of the above-described functions may be optional or may be combined. Although various aspects of the present disclosure are set out in the independent claims, other aspects of the present disclosure comprise other combinations of features from the described embodiments and/or the dependent claims with the features of the independent claims, and not solely the combinations explicitly set out in the claims.

The foregoing description has provided by way of non-limiting examples of particular implementations and embodiments of the present disclosure a full and informative description of the best mode presently contemplated by the inventors for carrying out the present disclosure. It is however clear to a person skilled in the art that the present disclosure is not restricted to details of the embodiments presented above, but that it can be implemented in other embodiments using equivalent means or in different combinations of embodiments without deviating from the characteristics of the present disclosure.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A server apparatus comprising:
  a communication interface for receiving, over a transmission path, a multimedia data item comprising captured multimedia data with associated metadata;
  at least one processor; and
  at least one memory including computer program code;
  the at least one memory and the computer program code configured to, with the at least one processor, cause the server apparatus to:
    define, by a server application, path information for the received multimedia data item based on the used transmission path, wherein the path information comprises at least:
      a capture identifier (CI) for identifying a multimedia data capturing application comprising a propriety application of a user apparatus, wherein the proprietary application is a client application of a service whose server application is running on the server apparatus; and
      a delivery identifier (DI) for identifying a multimedia data item delivering application comprising the proprietary application of the user apparatus that is the client application of the service whose server application is running on the server apparatus; and
    store, by the server application, the path information to the multimedia data item, by the server application, for providing enhanced authenticity of the association between the metadata and the captured multimedia data.

2. The apparatus of claim 1, wherein the at least one memory and the computer program code further configured to, with the at least one processor, cause the apparatus to:
  determine at least one of the following:
    the capture identifier (CI); and
    the delivery identifier (DI); and
  define a path identifier (PI) for identifying the used transmission path based on the at least one determined identifier.

3. The apparatus of claim 1, further comprising at least one of the following
- a user apparatus comprising a proprietary application;
- a multimedia device comprising an image sensor; and
- a computer apparatus comprising a messaging application.

4. The apparatus of claim 1, wherein the at least one memory and the computer program code further configured to, with the at least one processor, cause the apparatus to:
transmit the multimedia data item using the communication interface.

5. The apparatus of claim 1, further comprising at least one of the following
- a server apparatus.

6. A method for providing enhanced authenticity for a multimedia data item, the multimedia data item comprising captured multimedia data with associated metadata, the method comprising:
- receiving the multimedia data item over a transmission path;
- defining path information for the received multimedia data item based on the used transmission path, wherein the path information comprises at least:
  - a capture identifier (CI) for identifying a multimedia data capturing application comprising a proprietary application of a user apparatus that is a client application of a service whose server application is running on the server apparatus; and
  - a delivery identifier (DI) for identifying a multimedia data item delivering application comprising the proprietary application of the user apparatus that is the client application of the service whose server application is running on the server apparatus; and
- storing, by the server application, the path information to the multimedia data item for providing enhanced authenticity of the association between the metadata and the captured multimedia data.

7. The method of claim 6, wherein the multimedia data is captured using at least one of the following:
- proprietary multimedia capturing application of a user apparatus;
- default multimedia capturing application of a user apparatus; and
- multimedia capturing application of a multimedia device.

8. The method of claim 6, further comprising:
including the path information as a part of the metadata of the multimedia data item.

9. The method of claim 6, further comprising:
storing the path information as a separate element in the multimedia data item.

10. The method of claim 6, wherein
- a first transmission path corresponds to multimedia data captured and delivered to a server apparatus by the proprietary multimedia capturing application of the user apparatus;
- a second transmission path corresponds to multimedia data captured by the default multimedia capturing application of the user apparatus and delivered to the server apparatus by the proprietary multimedia capturing application of the user apparatus;
- a third transmission path corresponds to multimedia data captured by the multimedia capturing application of the multimedia device and delivered to the server apparatus by the proprietary multimedia capturing application of the user apparatus; and
- a fourth transmission path corresponds to multimedia data captured by the multimedia capturing application of the multimedia device and delivered to the server apparatus by a messaging application.

11. The method of claim 10, further comprising:
- determining a first class authenticity for the multimedia data item received over the first transmission path;
- determining a second class authenticity for the multimedia data item received over the second transmission path;
- determining a third class authenticity for the multimedia data item received over the third transmission path; and
- determining a fourth class authenticity for the multimedia data item received over the fourth transmission path.

12. The method of claim 6, wherein the path information comprises at least one of the following:
- a capture identifier (CI) for identifying a multimedia capturing application;
- a delivery identifier (DI) for identifying a multimedia data item delivering application; and
- a path identifier (PI) for identifying the used transmission path.

13. The method of claim 6, further comprising defining path information for the received multimedia data item based on the used transmission path and metadata attached to the multimedia data providing the multimedia data item.

14. The method of claim 13, further comprising storing the path information to the metadata of the multimedia data item.

15. The method of claim 6, wherein the proprietary application in the user apparatus is a client application of a service whose server application is running on the server apparatus, and the method further comprising:
- capturing, by the proprietary application, the multimedia data for the transmission path;
- retrieving automatically, by the proprietary application, metadata for the captured multimedia from metadata elements of the user apparatus; and
- attaching the metadata to the multimedia data to provide the multimedia data item.

16. A computer program embodied on a non-transitory computer readable medium comprising computer executable program code which, when executed by at least one processor of a server apparatus, causes the server apparatus to:
- receive a multimedia data item, by a server application, comprising captured multimedia data with associated metadata over a transmission path;
- define, by the server application, path information for the received multimedia data item based on the used transmission path, wherein the path information comprises at least:
  - a capture identifier (CI) for identifying a multimedia data capturing application comprising a proprietary application of a user apparatus that is a client application of a service whose server applicator is running on the server apparatus; and
  - a delivery identifier (DI) for identifying a multimedia data item delivering application comprising the proprietary application of the user apparatus that is the client and
- store, by the server application, the path information to the multimedia data item for providing enhanced authenticity of the association between the metadata and the captured multimedia data.

* * * * *